July 2, 1940.  G. H. WALKER  2,206,440
APPARATUS FOR EXPOSING LIQUIDS TO DIRECT CONTACT WITH AIR OR GASES
Filed Oct. 28, 1938   6 Sheets-Sheet 1

Inventor
G. H. Walker
by Jowden O'Brien
Attorney

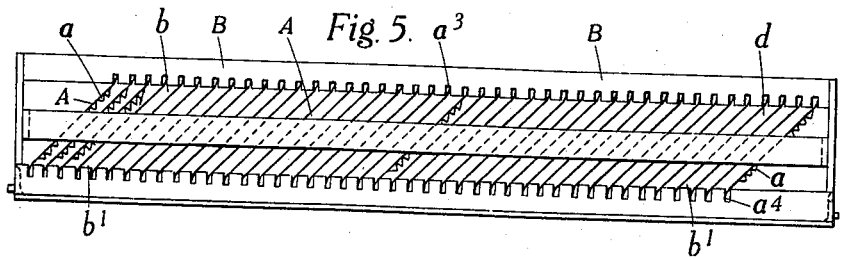
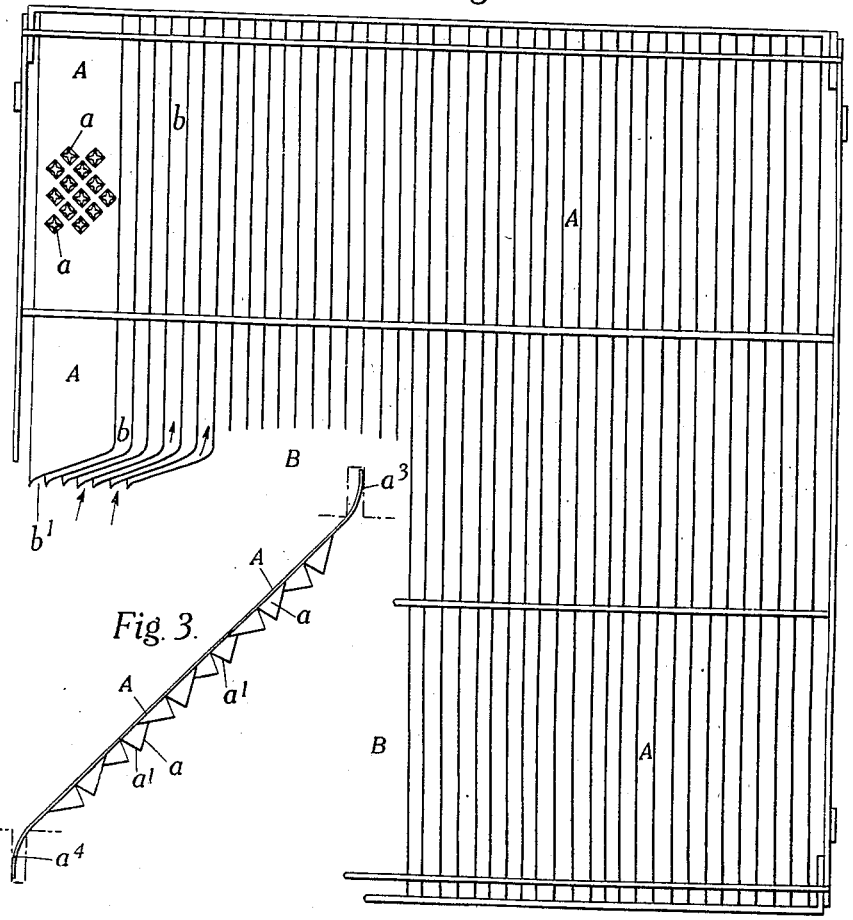

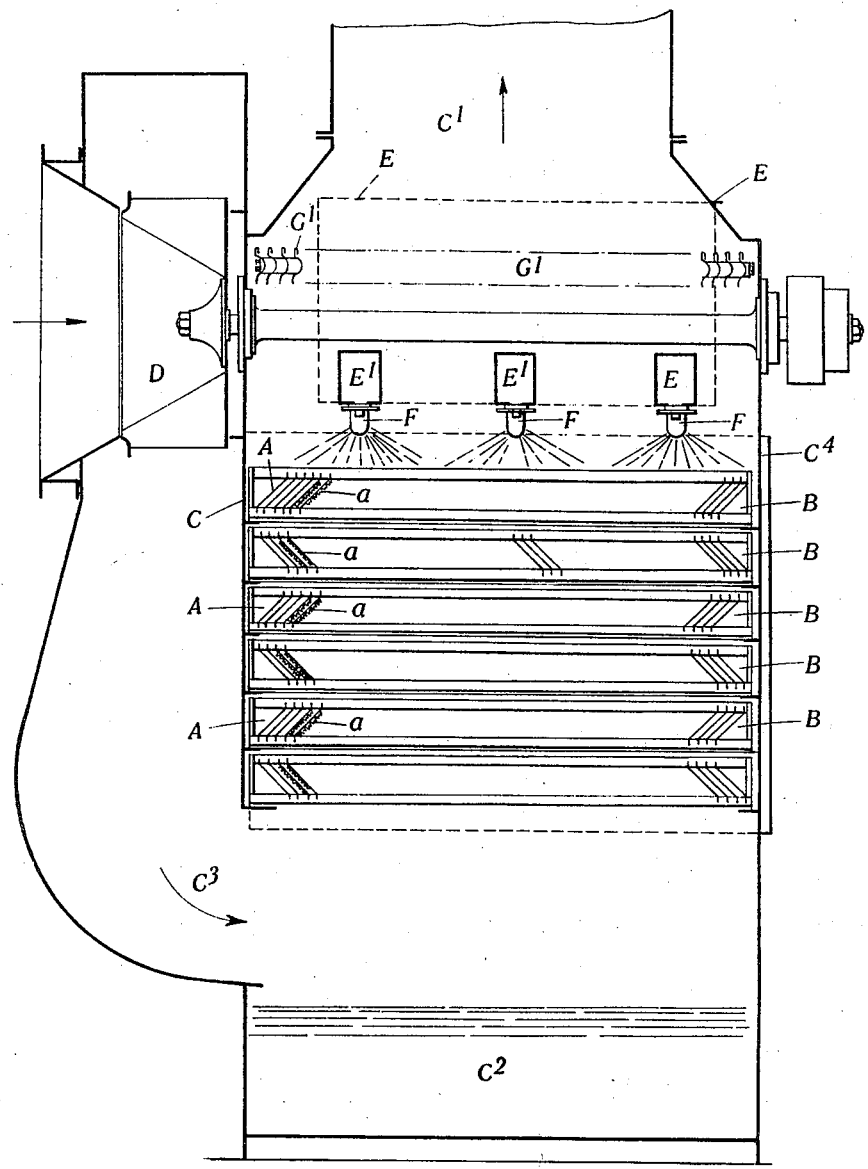

July 2, 1940.    G. H. WALKER    2,206,440
APPARATUS FOR EXPOSING LIQUIDS TO DIRECT CONTACT WITH AIR OR GASES
Filed Oct. 28, 1938    6 Sheets-Sheet 5

Inventor
G. H. Walker by
J. Owden O'Brien
Attorney

July 2, 1940.  G. H. WALKER  2,206,440
APPARATUS FOR EXPOSING LIQUIDS TO DIRECT CONTACT WITH AIR OR GASES
Filed Oct. 28, 1938  6 Sheets-Sheet 6

Inventor
G. H. Walker by
Lowden O'Brien
Attorney

Patented July 2, 1940

2,206,440

UNITED STATES PATENT OFFICE 2,206,440

APPARATUS FOR EXPOSING LIQUIDS TO DIRECT CONTACT WITH AIR OR GASES

George Henry Walker, Worcester, England, assignor to Heenan & Froude Limited, Worcester, England Application October 28, 1938, Serial No. 237,392
In Great Britain November 13, 1937

3 Claims. (Cl. 261—112)

This invention relates to improvements in apparatus for exposing liquids to direct contact with air or other gases of the type in which the liquid is caused to spread over a large surface or area and the gases brought into intimate contact therewith, the flow of the liquid and gases over the surfaces being preferably in opposite directions.

In such apparatus it is well known that the rate at which the heat transference takes place depends partly on the nature of the surface and partly on the velocity of the gases flowing in contact therewith.

The object of the present invention is an improved construction of the aforesaid apparatus in which the surface intended to promote contact between gases and liquids to facilitate the exchange of heat between the fluids will efficiently expose the liquid to the action of the gas and at the same time reduce the resistance to flow of both over the exposed surface.

According to the invention the apparatus is constructed of a plurality of flat plates or strips of metal or other suitable material the surface of each of which has conical or pyramidal protuberances pressed or punched out of the surface at intervals, the sides of the protuberances being split to form comparatively sharp projections against which the gases strike when flowing over the surface thereby promoting or increasing turbulence in the gases and consequently increasing the rate of heat transfer between them and the liquid the plates being vertical or inclined and so disposed relatively to one another that the gases will flow between them.

The conical or pyramidal protuberances may be of regular or irregular pitch and may be arranged in staggered or parallel formation.

Furthermore, between any one protuberance and the next a channel or gulley is formed along which the liquid passes. Thus when the liquid is flowing from edge to edge of the surface it is split up by the protuberances and the channels into numerous small streams, none of which continues unbroken for long, so that the liquid is prevented from collecting into streams which by capillary attraction would tend to segregate and to denude a portion of the cooling surface of liquid. Therefore the liquid is efficiently spread over the whole of the available cooling surface with corresponding improvement in heat transferring efficiency.

The invention will be described with reference to the accompanying drawings in which:

Fig. 3 is an end elevation of the plate showing the leading and trailing edges of the plate curved.

Fig. 4 is an elevation of a screen frame built up of a number of heat transferring plates.

Fig. 5 is an end view of the screen frame.

Fig. 6 is a vertical section of a mechanical cooler having a series of screens each built up of heat transferring plates mounted inside a casing one below the other.

Figure 1:
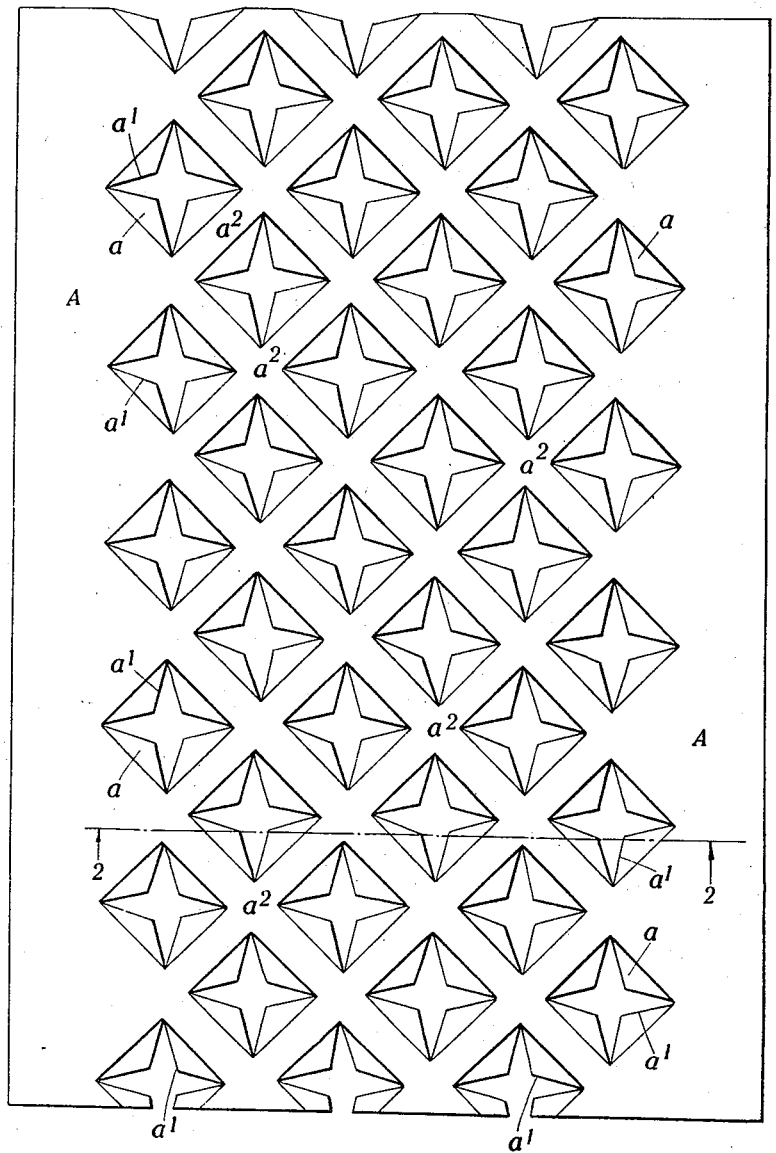
Fig. 1 is an elevation of a heat transferring plate formed according to the invention.

The heat transfer surface is formed of a thin strip or plate A of metal or other suitable material which if made of a corrodible metal may be protected by galvanising or other suitable surface. A series of conical or pyramidal protuberances $a$ are pressed or punched out of the surface of the plate, these protuberances being formed either with a regular pitch and staggered formation as shown in Fig. 1 or they may be of regular pitch and parallel formation or of irregular pitch.

The sides of the protuberances $a$ are split during their formation to form a number of relatively sharp edges $a^1$ against which the gases will strike during their passage over the plate thereby increasing or promoting turbulence of the gases and consequently increasing the rate of heat transfer between the gases and the liquid flowing over the plate. A channel or gulley $a^2$ is formed between each pair of protuberances $a$ along which the liquid will pass and be split up into numerous small streams none of which continues unbroken for long. The liquid is thus prevented from collecting into streams which, owing to capillary attraction, would tend to separate and denude a portion or portions of the plate A of liquid. The liquid is thus efficiently spread over the whole of the surface of the plate.

As shown in Fig. 3 the regions of the leading edge $a^3$ and trailing edge $a^4$ of the plate A are preferably curved so that when a series of plates A are assembled into a screen frame B (see Figs. 4 and 5) these edges form channels for the entry of the gases between the plates and for their egress therefrom whereby the inlet and egress can be effected gradually with initial and final velocities lower than the intermediate velocities. This effect is obtained as the area between each pair of plates for the flow of gases is a maximum at the entrance $b$, but gradually diminishes with consequent increase of velocity as the gases progress towards the narrower gap between the inclined surfaces. This enables the gases to approach at low velocity, thereby avoiding resistance to flow which would be set up in the absence of the curvature of the plates. Similarly the curvature at the outlets $b^1$ from the plates slows the velocity of the gases gradually, thereby recovering velocity head and converting it to pressure.

The increase of velocity of gases which takes place during their passage between the inclined plates A promotes efficient contact between the gases and the liquid, and together with the effect of the protuberances, promotes rapid interchange of heat.

Figure 2:
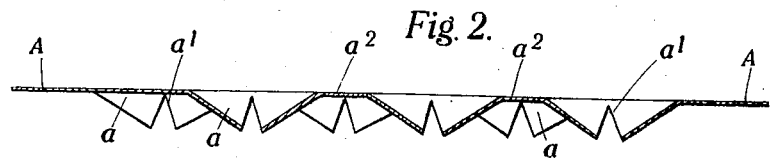
Fig. 2 is a section on line 2—2 Fig. 1.

Although the protuberances are shown in Figs. 1 to 3 on the under surface of the plate A they may be formed on the upper surface thereof.

The screens B formed as shown in Figs. 4 and 5 of the plates A may be employed in many types of heat transfer apparatus examples of which are shown in Figs. 6, 7, 10, 11 and 12, of the drawings.

Figure 7:
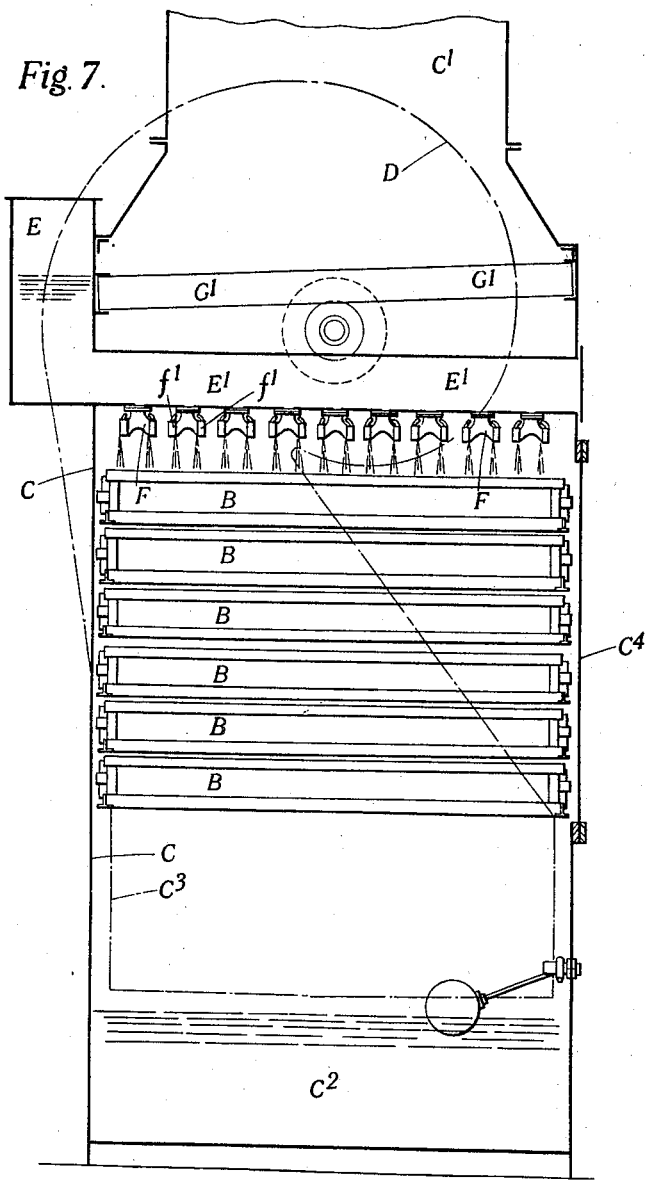
Fig. 7 is a vertical section at right angles to Fig. 6.

Figs. 6 and 7 show the screens B employed in a mechanical air cooler in which six screens B each formed of plates A are mounted one below the other in a casing C. The air to be cooled is supplied to the bottom of the casing C below the lowest screen B by a fan D which may be of the centrifugal type as shown or a propeller type. By reason of the pressure produced by the fan D the air rises in the casing C passing progressively through each screen B to the outlet duct $C^1$ at the top of the casing C.

A tank E to which the cooling liquid is supplied by a pump (not shown) or otherwise is arranged at the side of the casing C near the top thereof and connected to a series of transverse pipes or ducts $E^1$ above the top of the upper screen B. A number of nozzles F are arranged in the underside of the pipes $E^1$ through which the liquid is spread over the upper screen B from which it falls by gravity through each succeeding screen into a tank $C^2$ at the bottom of the casing below the air inlet $C^3$.

Figure 8:
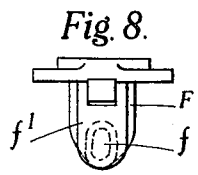
Figs. 8 and 9 are a front elevation and section respectively of a nozzle for supplying the liquid to the screens.
Figure 9:
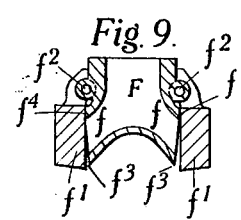

Any suitable form of nozzle may be employed for distributing the cooling liquid over the top screen B but the nozzle F shown in Figs. 8 and 9 is particularly applicable for the purpose. The nozzle F is formed with two inclined orifices $f$ on opposite sides which direct the liquid downwards. Each orifice $f$ is partly closed by a disc or flap $f^1$ hinged at a point $f^2$ above the top of the orifice.

The weight of the disc or flap $f^1$ acting downwardly at a short horizontal distance from the axis of the hinge, tends to hold its face against a stop $f^4$, so that when the head of liquid above the nozzle is slight the liquid emerges from the narrow gap $f^3$ between the face of the disc and the nozzle. When the head of liquid is increased as by an increase in the rate of flow, the pressure of the liquid upon the disc also increases and pushes the disc further away from the orifice. Under all conditions of flow the liquid impinges upon the disc and emerges through the gap between the orifice and disc in a fan-shaped stream directed substantially vertically downwards.

Any variation in rate of inflow automatically causes the disc or flap $f^1$ to approach or recede from the face of the nozzle and to increase or decrease the area requisite for the flow of liquid; the head of liquid above the orifice increasing or decreasing correspondingly.

A door $C^4$ is preferably arranged at one side of the casing C for easy removal and inspection of the screens B.

Moisture eliminators $G^1$ of any known type preferably inclined to the horizontal are arranged between the cooling liquid supply pipes and the air outlet $C^1$ for the purpose of extracting any liquid which may be held in suspension in the air and return it back to the casing.

If desired the fan D supplying the air to the casing C may be dispensed with and natural draught, assisted or otherwise by a chimney, may be utilized to induce a flow of air or gases through the apparatus.

Although in the foregoing description the apparatus is described as for cooling air or gases it can be equally well employed for cooling liquids, the liquid to be cooled being supplied by the nozzles F and the cooling air by the fan D.

Figure 10:
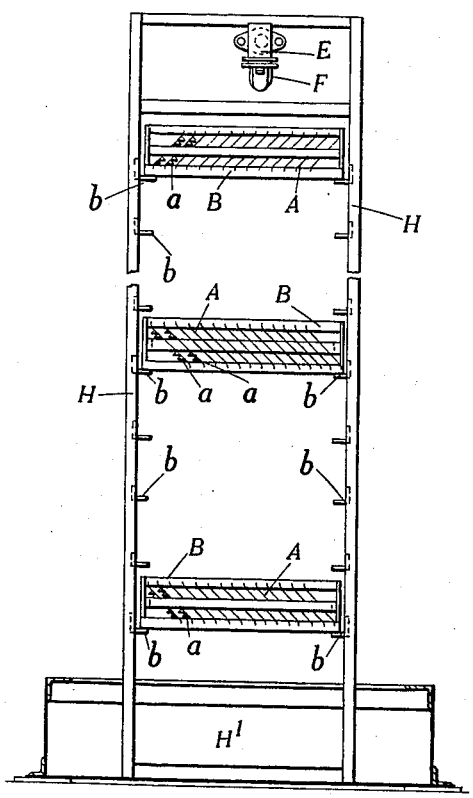
Fig. 10 is a vertical section of an open type of cooling tower employing a series of screens built up of heat transferring plates.
Figure 11:
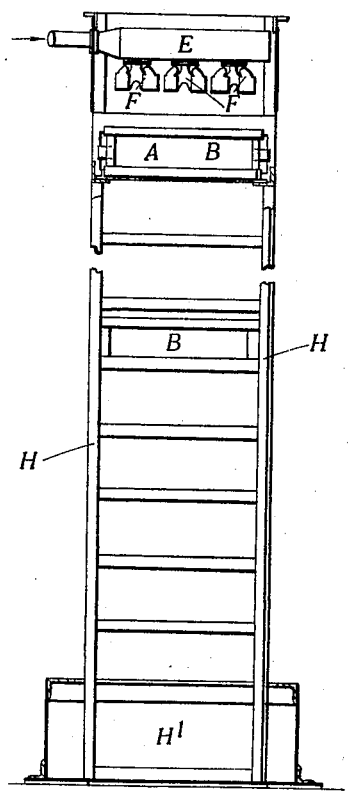
Fig. 11 is a vertical section at right angles to Fig. 10.

Figs. 10 and 11 show the screens B built up of the plates A employed in an open type of cooling tower for cooling water or other liquid. The screens B are carried by an open frame H being arranged one above the other and supported by brackets $b$ affixed to the upright members of the frame. The liquid to be cooled is supplied at the top to one or more transverse ducts E provided on the underside with distributing nozzles F preferably of the construction hereinbefore described with reference to Figs. 8 and 9. A tank $H_1$ is provided at the bottom of the tower to collect the liquid after it has passed down the screens B. A cooling tower of this type when erected in an exposed position will subject the liquid to a cooling effect of the atmosphere as the air will pass into the passages between the plates A of the screens B.

Figure 12:
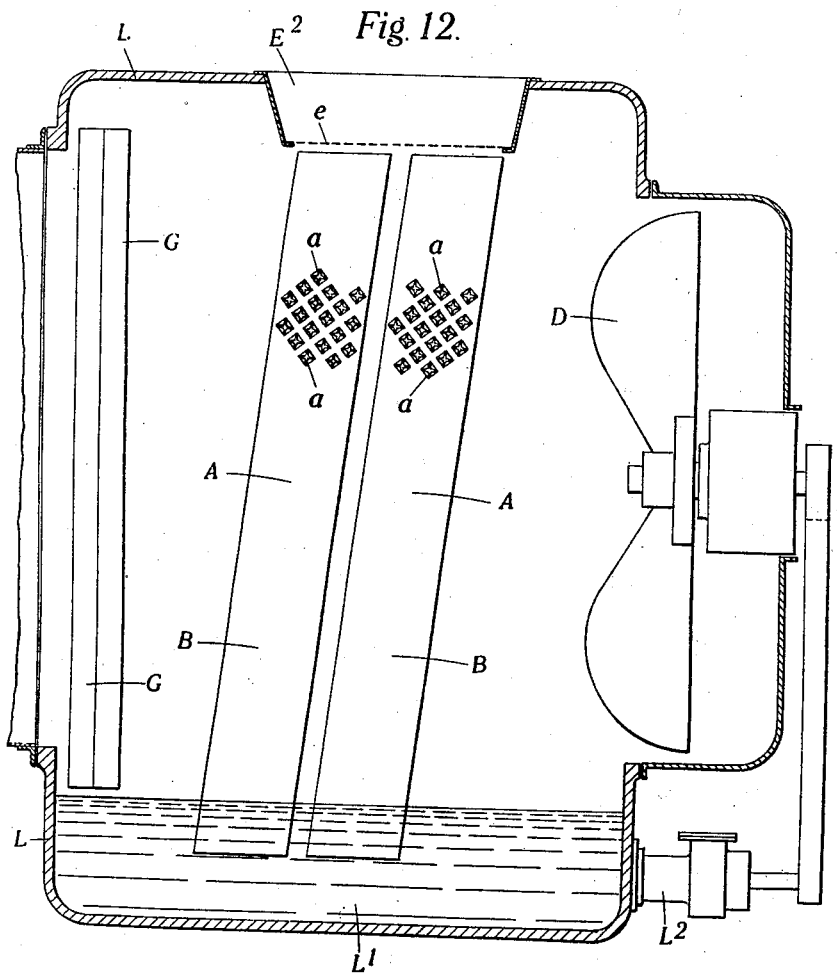
Fig. 12 is a vertical section of another type of cooling apparatus having the screens arranged substantially vertically.

In the type of cooling device shown in Fig. 12 the screens B built up of the plates A are arranged substantially vertically in a casing L through which the air or gas is passed horizontally by a fan D. The liquid is supplied from a tank $E^2$, provided with a perforated bottom $e$, above the top of the screens and flows down the plates A of the screens B to a tank $L^1$ at the bottom from which it is removed by a pump $L^2$. Moisture eliminators G may be arranged at the outlet end of the casing L.

Figure 13:
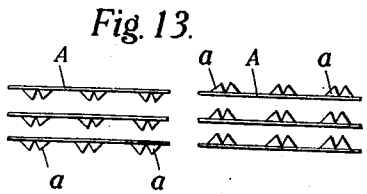
Figs. 13 and 14 illustrate different ways in which the plates may be disposed in the type of cooler shown in Fig. 12.
Figure 14:
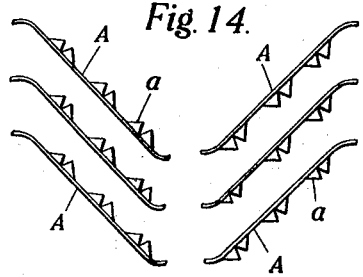

The plates A from which the screens B are built may be arranged to give a straight passage as shown in Fig. 13. Or a tortuous passage as shown in Fig. 14. In the former case the plates A need not be curved at the leading or trailing edges.

The cooling apparatus shown in Fig. 12 is equally applicable for cooling liquid by air or cooling gases by liquid.

It is to be understood that the use of heating transfer plates A formed in accordance with this invention is not limited to the various types of cooling or heat transferring apparatus shown in the drawings but can be employed in any other suitable form of such apparatus.

What I claim as my invention and desire to protect by Letters Patent is:

1. Heat exchange apparatus for promoting gas and liquid contact comprising a series of plates arranged in juxtaposition and in parallel planes to form screens, the leading edge and the trailing edge of each plate being curved to vary the velocity of the gases between the planes, pyramidal protuberances raised at intervals from the surface of each plate, each protuberance being split at its sides to form sharp edged projections of regular and defined shape to divide the liquid and distribute it evenly over the surface of the plate and against which the gases impinge while travelling between the planes.

2. A cooling tower for contacting gases with liquids comprising a casing, a series of plates arranged in juxtaposition to form screens said screens being arranged in parallel planes inclined to the vertical, frames in which the screens are mounted, the leading edge and the trailing edge of each plate being curved to vary the velocity of the gases between the planes, pyramidal protuberances raised at intervals from the surface of each plate, each protuberance being split at its sides to form sharp edge projections of regular and defined shape to divide the liquid and distribute it evenly over the surface of the plate and a fan to blow air through the casing.

3. A cooling tower for contacting gases with liquids comprising a casing, a series of plates arranged in juxtaposition to form screens, said screens being arranged in parallel planes inclined to the vertical, open frames in which the screens are mounted within the casing, the leading edge and the trailing edge of each plate being curved to vary the velocity of the gases between the planes, pyramidal protuberances raised at intervals from the surface of each plate, each protuberance being split at its sides to form sharp edged projections of regular and defined shape to divide the liquid and distribute it evenly over the surface of the plate and against which the gases impinge while travelling between the planes, and a tank to collect the liquid after travelling down the plates.

GEORGE HENRY WALKER.